US012458115B2

(12) United States Patent
Celant et al.

(10) Patent No.: US 12,458,115 B2
(45) Date of Patent: Nov. 4, 2025

(54) WATCH DEVICE HAVING MOVABLE COMPONENTS

(71) Applicant: ROLEX SA, Geneva (CH)

(72) Inventors: Benjamin Celant, Cornier (FR); Martin Christian, Eteaux (FR)

(73) Assignee: ROLEX SA, Geneva (CH)

( * ) Notice: Subject to any disclaimer, the term of this patent is extended or adjusted under 35 U.S.C. 154(b) by 1204 days.

(21) Appl. No.: 16/266,449

(22) Filed: Feb. 4, 2019

(65) Prior Publication Data

US 2019/0254391 A1 Aug. 22, 2019

(30) Foreign Application Priority Data

Feb. 16, 2018 (EP) .................................... 18157057

(51) Int. Cl.

*A44C 5/00* (2006.01)
*A44C 5/02* (2006.01)
*A44C 5/08* (2006.01)
*A44C 5/24* (2006.01)
*G04B 37/14* (2006.01)
(Continued)

(52) U.S. Cl.

CPC .............. *A44C 5/02* (2013.01); *A44C 5/0053* (2013.01); *A44C 5/08* (2013.01); *A44C 5/246* (2013.01); *G04B 37/225* (2013.01); *G04B 37/0008* (2013.01)

(58) Field of Classification Search

CPC ........... A44C 5/14; A44C 5/02; A44C 5/0053; A44C 5/08; A44C 5/246; Y10T 24/2155; G04B 37/225; G04B 37/0008

See application file for complete search history.

(56) References Cited

U.S. PATENT DOCUMENTS 1,985,835 A * 12/1934 Prestinari ............... A44C 5/246 24/71 J
4,928,359 A 5/1990 Gagnebin
(Continued)

FOREIGN PATENT DOCUMENTS

CN 1651266 A 8/2005
CN 1969707 A 5/2007
(Continued)

OTHER PUBLICATIONS

European Search Report dated Jul. 30, 2018 issued in counterpart application No. EP18157057; w/ English machine translation (14 pages).

(Continued)

*Primary Examiner* — Jack W Lavinder
(74) *Attorney, Agent, or Firm* — WHDA, LLP

(57) ABSTRACT

A watch device, more particularly an external watch device comprising two components (1, 21) linked to one another, the first component (1) comprising a first guiding element (10) and the second component (21) comprising a second guiding element (30), the two components being linked to one another in a movable manner by the cooperation of their respective guiding elements (10, 30), wherein the first guiding element (10) comprises a guiding surface in contact at least partially with the second guiding element (30), said guiding surface comprising a polymer material belonging to the family of polyaryl ether ketones (PAEK).

22 Claims, 7 Drawing Sheets

(51) Int. Cl.

| | |
|---|---|
| ***G04B 37/22*** | (2006.01) |
| *G04B 37/00* | (2006.01) |

(56) References Cited

U.S. PATENT DOCUMENTS

| | | | | |
|---|---|---|---|---|
| 5,830,391 | A * | 11/1998 | Lamkemeyer | B29C 48/31 425/141 |
| 8,001,658 | B2 * | 8/2011 | Christian | A44C 5/246 24/71 J |
| 9,198,484 | B2 | 12/2015 | Knuchel | |
| 2005/0196636 | A1 | 9/2005 | Kawakami et al. | |
| 2007/0125123 | A1 | 6/2007 | Sierro | |
| 2008/0083101 | A1 | 4/2008 | Christian et al. | |
| 2011/0259677 | A1 * | 10/2011 | Dudde | D07B 1/145 187/411 |
| 2012/0184385 | A1 * | 7/2012 | Davis | A63J 1/02 254/387 |
| 2012/0240361 | A1 | 9/2012 | Leger et al. | |
| 2014/0130545 | A1 | 5/2014 | Leger | |
| 2014/0223705 | A1 | 8/2014 | Catanese | |
| 2015/0003217 | A1 | 1/2015 | Leoni et al. | |
| 2015/0103639 | A1 | 4/2015 | Portet et al. | |
| 2015/0107299 | A1 | 4/2015 | Knuchel | |
| 2017/0035156 | A1 | 2/2017 | Wright et al. | |
| 2018/0059620 | A1 | 3/2018 | Baebler et al. | |
| 2021/0088976 | A1 * | 3/2021 | Le Loarer | B29C 70/12 |

FOREIGN PATENT DOCUMENTS

| | | | |
|---|---|---|---|
| CN | 102630145 | A | 8/2012 |
| CN | 103732095 | A | 4/2014 |
| CN | 105029841 | A | 11/2015 |
| EP | 0081616 | A1 | 6/1983 |
| EP | 0 350 785 | A1 | 1/1990 |
| EP | 1908366 | A1 | 4/2008 |
| EP | 1908366 | B1 | 6/2009 |
| EP | 2749966 | A1 | 7/2014 |
| EP | 2 818 942 | A1 | 12/2014 |
| EP | 3 287 855 | A1 | 2/2018 |
| JP | S47-27964 | Y1 | 8/1972 |
| JP | S48-39968 | U | 5/1973 |
| JP | S51-18168 | U | 2/1976 |
| JP | S55-102810 | A | 8/1980 |
| JP | H09-177940 | A | 7/1997 |
| JP | 2000-279217 | A | 10/2000 |
| JP | 2001-204518 | A | 7/2001 |
| JP | 2002-516195 | A | 6/2002 |
| JP | 2005-212461 | A | 8/2005 |
| JP | 2006-329252 | A | 12/2006 |
| JP | 2008-26030 | A | 2/2008 |
| JP | 2010-174227 | A | 8/2010 |
| JP | 2015-11028 | A | 1/2015 |
| KR | 101616374 | B1 | 4/2016 |
| WO | 99/61218 | A1 | 12/1999 |
| WO | 2013/167624 | A1 | 11/2013 |
| WO | 2014/114404 | A1 | 7/2014 |

OTHER PUBLICATIONS

Office Action dated Mar. 10, 2022, issued in counterpart CN Application No. 201980013465.1, with English Translation. (17 pages).

Office Action dated Mar. 11, 2022, issued in counterpart CN Application No. 201910117654.5, with English Translation. (16 pages).

Office Action dated Dec. 27, 2022, issued in counterpart to JP Application No. 2019-019240, with English Translation. (10 pages).

Office Action dated Feb. 7, 2023, issued in counterpart to JP Application No. 2020-543532, with English Translation. (6 pages).

Office Action dated Mar. 6, 2023, issued in counterpart CN Application No. 201980013465.1, with English Translation. (19 pages).

Office Action dated Oct. 31, 2023, issued in counterpart JP application No. 2020-543532, with English translation. (8 pages).

* cited by examiner

WATCH DEVICE HAVING MOVABLE COMPONENTS

This application claims priority of European patent application No. EP18157057.3 filed Feb. 16, 2018, which is hereby incorporated by reference herein in its entirety.

INTRODUCTION

The present invention concerns a watch device comprising at least two components that are movable in relation to one another. This watch device may be a clasp for a watch bracelet, or a watch bracelet, or any watch device comprising at least one external component, also called external watch device. The invention also relates to a watch as such comprising a suchlike watch device.

PRIOR ART

Besides watch movements and the many gearings and mechanisms that a suchlike watch movement may comprise, a plurality of other situations exist, in which a watch device comprises two components that are movable relative to one another.

For example, a clasp is usually fitted with a device for adjusting the length of a watch bracelet. For this purpose, it may comprise a linkage or a link that is movable relative to a clasp cover, which may occupy a plurality of different stable positions within the clasp, corresponding to different lengths of watch bracelet.

In another example described in document WO2014114404, a watch bracelet link is adjustable by means of a structure in the form of two half-links that are movable relative to one another.

More generally, a device comprising external watch components often comprises two movable components.

In all cases, the movable components of a watch device are equipped with guiding elements that are subject to numerous loadings, among which:

- a mechanical stress in the course of their function of guiding the displacement of a component;
- an exceptional mechanical loading in the course of a particular event, such as a fall, an impact, pulling, torsion, etc.;
- environmental stresses, such as pollution or the wearer's perspiration, which could possibly give rise to degradation by corrosion or oxidation.

The overall objective of the invention is to propose a solution which permits an optimal response to the above-mentioned loadings.

More particularly, a first object of the invention is to propose a solution for guiding the movable components of a watch device, making it possible to limit the wear on the guiding elements, to reduce their friction, and to lower the risk of seizure and their corrosion.

In addition, a second object of the invention is to propose a solution for guiding the movable components of a watch device making it possible to limit, or even to prevent, the deposition and/or the accumulation of dirt in the guiding elements.

A third object of the invention is to propose a solution for guiding the movable components of a watch device which improves the comfort of the wearer.

BRIEF DESCRIPTION OF THE INVENTION

For this purpose, the invention is based on a watch device, more particularly an external watch device comprising one or two external watch components linked to one another, the first component comprising a first guiding element and the second component comprising a second guiding element, the two components being linked to one another in a movable manner by the cooperation of their respective guiding elements, wherein the first guiding element comprises a guiding surface in contact at least partially with the second guiding element, this guiding surface comprising a polymer material belonging to the family of polyaryl ether ketones (PAEK).

The invention is defined more precisely by the claims.

BRIEF DESCRIPTION OF THE FIGURES

These objects, characterizing features and advantages of the invention are explained in detail in the following description of particular embodiments, which are provided without limitation in relation to the figures attached hereto, among which.

Figure 1:
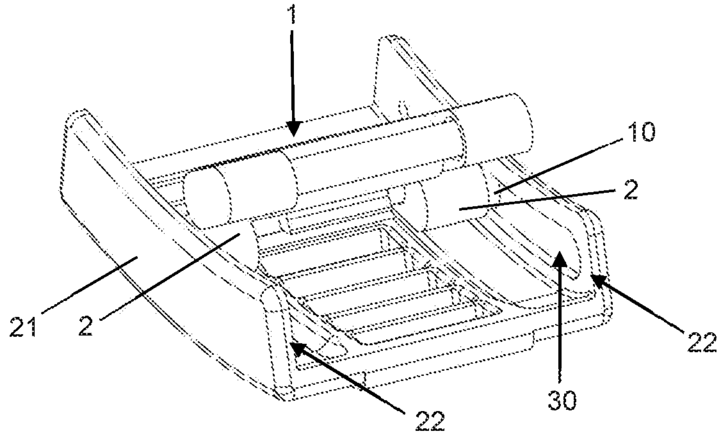
FIG. 1 depicts a view in perspective of a clasp cover incorporating a device for adjusting the length of a watch bracelet according to a first embodiment of the invention.
Figure 2:
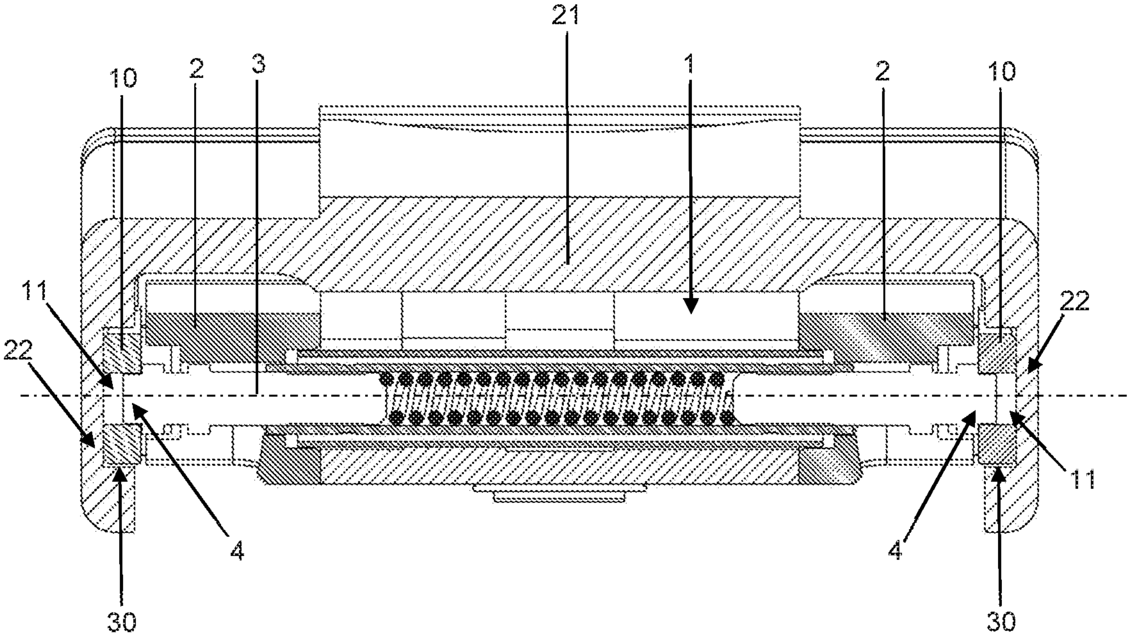
FIG. 2 depicts a view in section according to a transverse plane of the clasp cover in the area of the device for adjusting the length of the watch bracelet according to the first embodiment of the invention.

The first embodiment of the invention is based on a watch device permitting the adjustment of the length of a watch bracelet inside a clasp, as depicted in FIGS. 1 and 2. A suchlike watch device comprises a first component 1, which is a linkage in this first embodiment, being movably mounted relative to a second component 21, which is a clasp cover.

The first component 1 of the watch device according to this embodiment comprises two lateral extension links 2 arranged movably in rotation about of a spring bar 3. The extremities of this spring bar 3 comprise first guiding elements 10, which are positioned in a runner of the clasp cover.

The second component 21 of the watch device according to this first embodiment, more particularly depicted in FIG. 1, is a clasp cover comprising two lateral walls 22, each comprising a runner, as mentioned above. Each runner forms a second guiding element 30, which cooperates with a first guiding element 10.

In this first embodiment, the first guiding element 10 is advantageously in the form of a shoe or a roller, and the second guiding element 30 is in the form of a runner or a slide, or a bore, configured to receive a suchlike shoe. The shoes arranged at each extremity of the spring bar 3 thus slide in a parallel manner, in their respective opposite runners, according to a movement corresponding substantially to a translation.

In this first embodiment, the first guiding element 10 is in the form of a distinct element of the first component 1. In this particular construction, two shoes having slightly arched profiles are disposed respectively to either side of the linkage comprising two lateral extension links 2, and are assembled to these extension links by means of the spring bar 3. For this purpose, the shoes include a central bore 11 provided for their positioning around a cylindrical receiving zone 4 at the extremity of the spring bar 3, as can be appreciated in particular in FIG. 2.

In this embodiment, the first guiding elements 10, that is to say the shoes or rollers, are in a single piece. In addition, they are composed entirely of a high-performance polymer belonging to the family of polyaryl ether ketones (PAEK), more particularly a polyether ether ketone (PEEK).

Studies undertaken by the applicant have revealed that a suchlike polymer has the advantage more particularly of optimizing the reliability and the durability of the components with an enhanced resistance to wear and abrasion. In particular, the performances in terms of sliding and durability are superior, among other things, to those of the polymers of the polyacetal family.

As an alternative, the first guiding elements 10 could simply include a portion made from a high-performance polymer belonging to the family of polyaryl ether ketones (PAEK), more particularly made from PEEK. More particularly, this portion could be in the area of a guiding surface, intended to make contact with the second guiding element 30, that is to say the slider. This portion may thus adopt the form of a surface coating in the area of the contact zones or the friction zones. More particularly, a configuration made from PEEK may be overmolded onto a shoe. By way of example, the first guiding element 10 may comprise a core covered with a coating comprising the polymer material belonging to the PAEK family forming all or part of the guiding surface.

Figure 3:
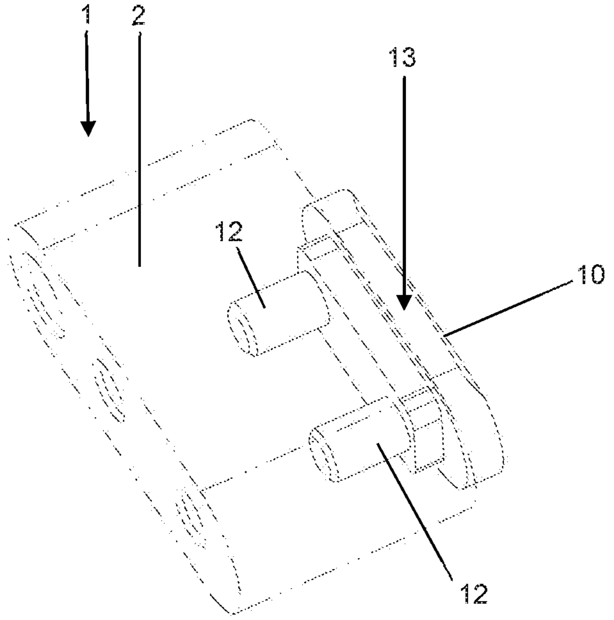
FIG. 3 depicts a variant embodiment of a first component of a watch device according to the first embodiment of the invention.

FIG. 3 depicts a variant embodiment in which a component comprising the first guiding element 10 is secured directly to the first component 1. In this variant, this component comprises attachment studs 12 on a lateral face, which are provided in order to be pushed into the bores of a lateral extension link 2 of the first component 1. This attachment may be implemented, for example, by pushing-in, riveting, adhesive bonding, welding or brazing. This component comprises the guiding element 10 which comprises a guiding surface 13 on its second lateral face.

Figure 5:
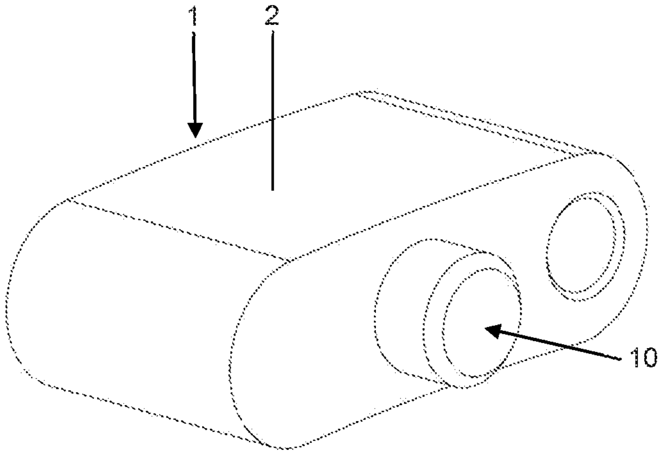
FIG. 5 illustrates a first component of a watch device according to a variant of the first embodiment.

FIG. 5 illustrates a first component 1 according to a variant embodiment. This first component 1 comprises a link 2 which comprises a protrusion, more particularly a circular or oblong protrusion, which serves as a shoe. This circular protrusion is formed on a flank of said link 2 and forms the guiding element 10 of the first component. In this particular case, the link 2 is in a single piece, that is to say it is made from a high-performance polymer, more particularly from a polymer material belonging to the family of polyaryl ether ketones (PAEK), in particular being made from PEEK. As an alternative, the protrusion may be overmolded on a flank of the link 2. As a further alternative, the protrusion may be coated with PAEK, for example with PEEK, on all or part of its surface.

The first embodiment is described on the basis of a first component 1 comprising a guiding element 10 composed at least partially of a material belonging to the family of polyaryl ether ketones (PAEK). Naturally, a guiding element 30 of the second component 21 could also comprise a material belonging to the family of polyaryl ether ketones (PAEK). In other words, any of the two movable components of the watch device may comprise, in all or in part, a material belonging to the family of polyaryl ether ketones (PAEK) on all or part of its guiding surface. As an alternative, the two movable components of the watch device may comprise a suchlike material.

Figure 4:
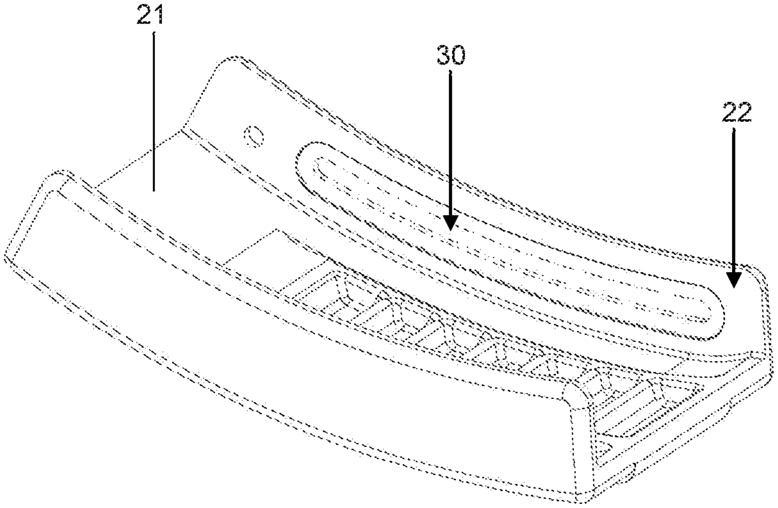
FIG. 4 depicts a variant embodiment of a second component of a watch device according to the first embodiment of the invention.

The second guiding element 30 may be made from steel or from a precious material such as gold or platinum. As an alternative, the second guiding element 30 may be made from a ceramic material. More particularly, it may be formed integrally in a single piece with a component made from a ceramic material or from steel or from a precious material such as gold or platinum. As mentioned above, the second guiding element 30 may, as a variant, be made from a high-performance polymer, more particularly from a polymer material belonging to the family of polyaryl ether ketones (PAEK), in particular being made from PEEK. More particularly, it may be formed integrally in a single piece with a second movable component made entirely from PEEK. As an alternative, as depicted in FIG. 4, the second guiding element 30 may be attached to a component preferably made from steel or from a precious material such as gold or platinum. As a further alternative, the second guiding element 30 may be attached to a component made from a ceramic material.

Figure 6:
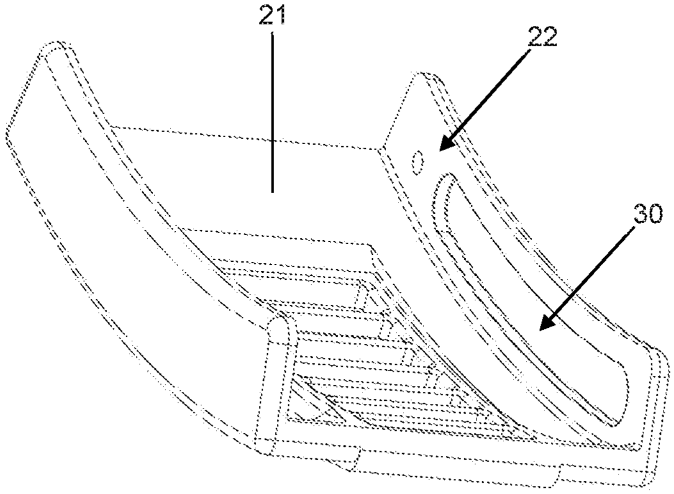
FIG. 6 depicts a second component of a watch device according to a variant of the first embodiment of the invention.

By way of example, FIG. 6 illustrates a clasp cover fitted with slides disposed in lateral walls to either side of said cover, in a manner similar to that of the first embodiment described previously. In this particular case, the cover is in a single piece, composed entirely of a high-performance polymer, more particularly of PEEK. As an alternative, only the slides may be coated with a polymer material belonging to the family of polyaryl ether ketones (PAEK), more particularly with PEEK, on all or part of their surface.

The invention is not restricted to the described embodiment, in which the watch device is a device for extending a watch bracelet for a clasp. It is applicable to any watch device, more particularly an external watch device comprising at least one external watch component, in which a second component is configured to receive within it a guiding element of a first component, such as a roller or a shoe. A suchlike second component may thus include a cutout, for example, such as a bore or a groove. This cutout may or may not be open-ended.

In addition, the relative displacement of the two components of the watch device is advantageously a translational motion, and optionally a slightly curved sliding motion, which may correspond more particularly to the curvature of a clasp cover. As a variant, this displacement may be an articulation such as a rotation, for example.

Thus, a guiding element for a movable component may be any means permitting the relative displacement of a first component 1 relative to a second component 21.

Figure 7:
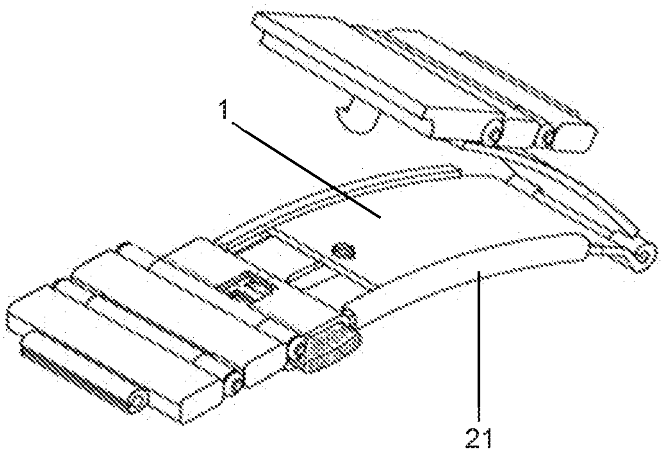
FIG. 7 depicts a watch device according to a second embodiment of the invention.

According to a second embodiment depicted in FIG. 7, the first component 1 may be a clasp blade arranged in order to move substantially in translation relative to a second clasp blade, representing a second component 21, like the clasp blades described in document EP0350785.

Figure 8:
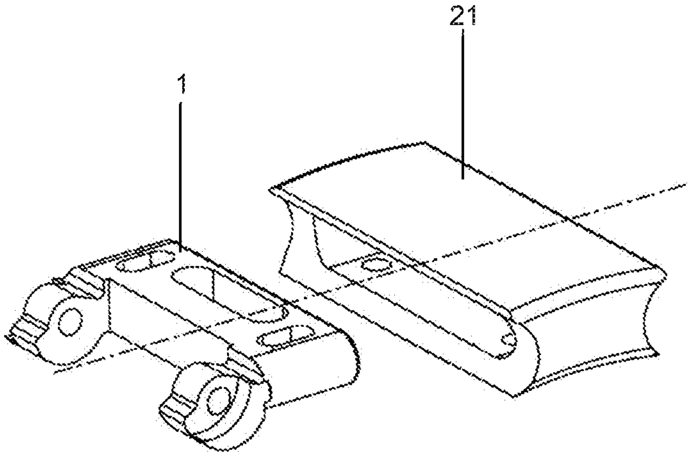
FIG. 8 depicts a watch device according to a third embodiment of the invention.

According to a third embodiment depicted in FIG. 8, the first component 1 may be in the form of a half-link of a link provided in order to move relative to a second half-link of said link, representing a second component 21, in a similar manner to the half-links described in document WO2014114404.

The preceding embodiments finally make it possible to achieve the objects sought by the utilization of a material belonging to the family of polyaryl ether ketones (PAEK) on all or part of a guiding element, as has already been described.

In this family of polyaryl ether ketones (PAEK), the chosen material may be non-filled or filled. A filler charge makes it possible to optimize, among other things, the characterizing tribological and mechanical features of the component. By way of example, the filler charge may comprise at least reinforcement fibers and/or a lubricating agent and/or graphite. As a variant, the filler charge may likewise comprise at least a pigment, more particularly with the aim of coloring the component.

According to illustrative embodiments, the selected material will be made from PAEK, more particularly from PEEK, from polyether ether ether ketone (PEEEK), from polyether ketone (PEK), from polyether ketone ketone (PEKK) or a co-polymer of the latter and/or a mixture of polymers. On the other hand, this polymer material may advantageously comprise at least a filler charge of polytetrafluoroethylene (PTFE), of molybdenum disulphide, of tungsten disulphide, of hexagonal boron nitride, of carbon fibers, of aramid fibers, of glass fibers, of graphite, of graphene, of carbon nanotubes, of polyimides, of polyphenylene sulphide, of diamond nanoparticles, of polysilsesquioxanes, of boron fibers or a combination of two or more of the latter. The preceding list is naturally non-restrictive.

According to one particular embodiment, the material is PEEK which contains 20% of PTFE, for example Victrex® 450FE20. According to another embodiment, the material is PEEK which contains 30% of additives, more particularly carbon fibers and/or graphite and/or PTFE. According to another embodiment, the material is PEEK which contains 30% of carbon fibers and additional additives, more particularly graphite and/or PTFE. As an alternative or in addition to the carbon fibers, the fibers contained within the PEEK may be aramid fibers or boron fibers. Examples of PAEK or of PEEK that may be utilized include, among other things: Victrex® PEEK 450FC30, Ketron® HPV, Tekapeek® PVX, KetaSpire® KT-820 SL30, AKROTEK® PAEK CF30, AvaSpire® AV-651 CF30, AvaSpire® AV-722 SL30, AvaSpire® AV-755 SL45. It should be noted that, in all cases, and more particularly in all the described embodiments, the polymer PEEK may be replaced by any other polymer of the PAEK family.

According to one particular embodiment, the component comprises 65% of PEEK, 15% of carbon fibers, 10% of PTFE, 8% of carbon nanotubes and 2% of nanodiamond.

The element or the part of the element made from a material belonging to the family of polyaryl ether ketones (PAEK) is made by any process or combination of processes that are familiar to person skilled in the art. According to a variant embodiment, the surface of the component or the part of the component made from a material belonging to the family of polyaryl ether ketones (PAEK) may be structured, in particular microstructured, more particularly with the aim of putting together a first element with the aim of optimizing the tribological behavior and/or the wear of the surface made from PAEK, or of permitting the improved distribution of a lubricant. This structuring may be obtained directly during molding of the component or subsequently by machining or micromachining, for example by laser texturing (in English laser surface texturing or LST) or by chemical etching. Any other technique or combination of techniques may also be implemented in order to obtain structuring or microstructuring.

According to one particular embodiment of the invention, it is apparent that the guiding element or the part of the guiding element, which may be a component made from polymer or from metal, is coated at least partially with a coating comprising a material belonging to the family of polyaryl ether ketones (PAEK), more particularly PEEK. In a suchlike embodiment, the coating may be applied by utilizing conventional techniques of spraying by dispersion, electrostatic projection techniques or overmolding. A coating may likewise be applied to an element according to one of the preceding embodiments with or without microstructuring of the surface of said component: for example, a DLC coating or any other appropriate coating technique. Microstructuring of the surface may likewise be effected after application of the coating.

In addition, the relative displacement of two movable components of a watch device also advantageously requires an indexing device, which permits certain stable positions to be predetermined relative to said two movable components. A suchlike indexing device is implemented by means of indexing elements for each of the two movable components. One technical problem which arises is that of being able to combine this indexing device optimally with the device for guiding the two movable components.

Figure 9:
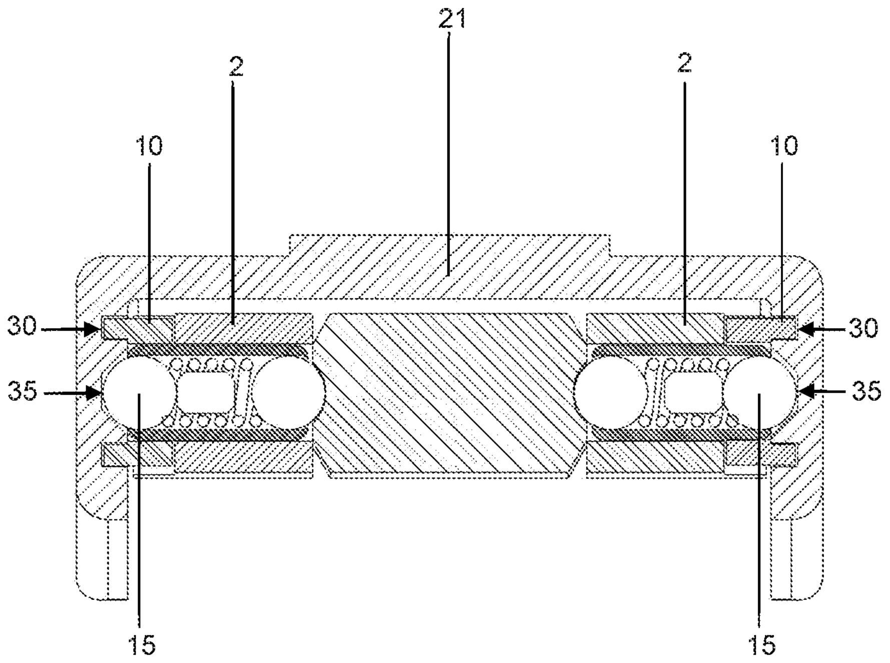
FIG. 9 depicts a view in section according to a transverse plane of a clasp cover in the area of a device for adjusting the length of a watch bracelet according to a fourth embodiment of the invention.
Figure 10:
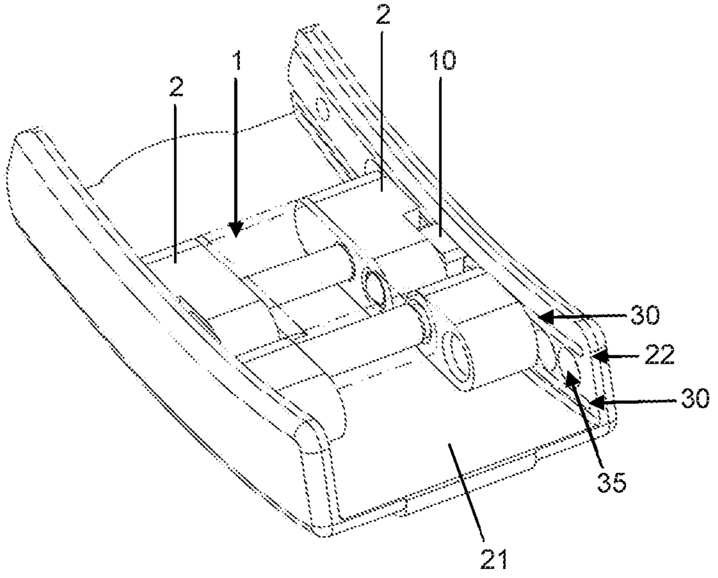
FIG. 10 depicts a view in perspective of a clasp cover incorporating the device for adjusting the length of a watch bracelet according to the fourth embodiment of the invention.

FIGS. 9 and 10 thus describe a fourth embodiment of the invention, in which an element 10 for guiding the first component 1 includes at least a first indexing element 15, which is provided in order to cooperate with a second indexing element 35 of the second component 21. This fourth embodiment concerns an extension device for a watch bracelet, similar to that of the first embodiment, but comprising an indexing device. For this purpose, an extension link 2 of a first component 1 is movable relative to a clasp cover. Resiliently biased balls are provided at the extremity of the links in order to cooperate with notches adjoining a runner of the clasp cover; each notch, because of its ability to accommodate temporarily an elastic ball, corresponds to a predefined position of a link for adjustment relative to the cover. This device effectively implements the indexation of the position of the two components.

In this embodiment, a shoe made from PEEK always forms a guiding element of the first component. This shoe is in the form of a U, of which the two flanks are provided respectively in order to move in two upper and lower portions of a slider in the form of two upper and lower parallel grooves. The balls forming the indexing element are arranged between the two flanks of the U and are adapted to be accommodated in notches arranged between the two grooves forming the second guiding element 30. These notches form the second indexing element.

It should be noted that, in this embodiment, the indexing elements are arranged in proximity to the guiding elements in a combined but relatively independent manner.

Figure 11:
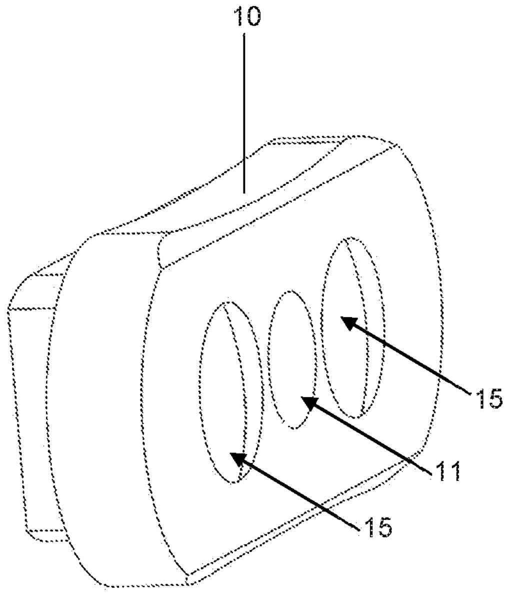
FIG. 11 depicts a view in perspective of a guiding element of a device for adjusting the length of a watch bracelet according to a fifth embodiment of the invention.
Figure 12:
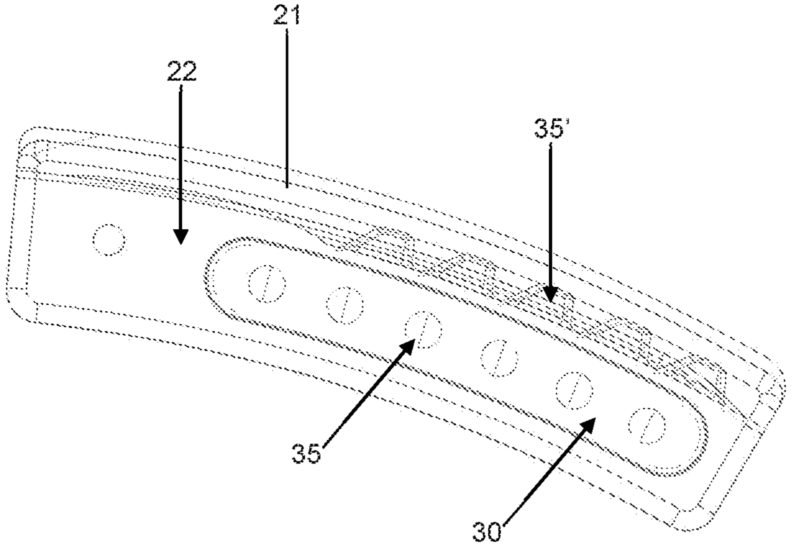
FIG. 12 depicts a view in section according to a longitudinal plane of a clasp cover of the device for adjusting the length of a watch bracelet according to the fifth embodiment of the invention.

As an alternative or in addition, the first indexing element 15 may be supported by the first guiding element 10. By way of example, FIG. 11 illustrates a guiding element 10 for the first component 1 which comprises indexing elements 15 in the form of protrusions implemented directly on the guiding element, more particularly a shoe in a single piece. As depicted in FIG. 9, these protrusions may exhibit a hemispherical configuration. As an alternative, these protrusions may exhibit some other geometry, such as a rectangular and/or elongated geometry. These protrusions are provided in order to cooperate with a second indexing element 35 in the form of a succession of notches disposed within a slider of a clasp cover, as depicted in FIG. 12. In this embodiment, the protrusions are made from the material of the guiding element, for example made from PAEK, and more particularly from PEEK, since the assembly is in a single piece. As an alternative, the protrusions may be made from another material, and may be formed more particularly on a shoe, of which at least a portion is made from or is coated with PAEK.

It should be noted that the indexing device described above may be combined with an additional indexing device or fixing device for a watch bracelet link relative to a clasp cover, that is to say it may complement a conventional indexation system, such as an indexation system with a spring bar, or an indexation system with balls more particularly implementing toothing 35' such as that depicted in FIG. 12. Such conventional indexing device actually forms a fixing device, implements a fixing function.

Thus, the invention also relates to a watch device, more particularly an external watch device comprising two external components 1, 21 linked to one another at least one being an external component, the first component 1 comprising a first guiding element 10 and the second component 21 comprising a second guiding element 30, the two components being linked to one another in a movable manner by the cooperation of their respective guiding elements 10, 30, and wherein the first component 1 comprises a first indexing element 15 which cooperates with a second indexing element of the second component 21.

It should be noted that the notching forming a first indexing element complements or serves as an alternative to the toothing that is familiar from the state of the art, for example the toothing 35' in FIG. 10.

An indexing element may form an assembly in a single piece with a guiding element, or a separate element arranged in proximity to a guiding element, for example by an elastic ball or protrusion disposed between two guide ribs.

It is evident that these indexing elements are subjected to loadings very close to those experienced by the guiding elements. Thus, they may advantageously also comprise a polymer material belonging to the family of polyaryl ether ketones (PAEK).

As a variant, the first indexing element 15 may be implemented independently of the first guiding element 10.

Thus, the invention also relates to a watch device, more particularly an external watch device, comprising two components 1, 21 linked to one another, the first component 1 comprising a first indexing element 15 and the second component 21 comprising a second indexing element 35, the two components being linked to one another in a movable manner, and wherein the first indexing element 15 and/or the second indexing element 35 comprises a contact surface, comprising a polymer material belonging to the family of polyaryl ether ketones (PAEK).

Figure 13:
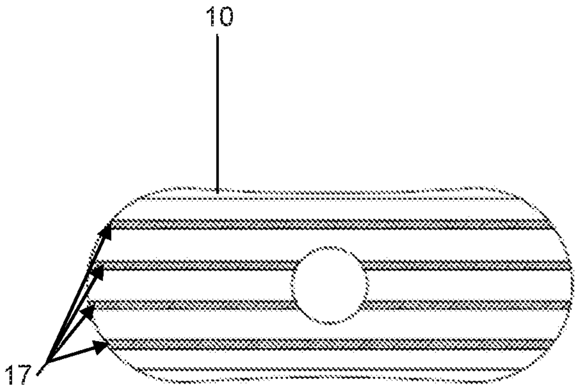
FIG. 13 depicts a view from the side of a guiding element incorporating an element for channeling a lubricant according to an embodiment of the invention.

As a complement to the preceding solutions, the first guiding element 10 may include at least one element for channeling 17 a lubricant. By way of example, FIG. 13 depicts a view of a lateral face of a guiding element 10 for a first component according to a fifth embodiment of the invention, comprising channels or grooves provided in order to be filled with a lubricant: these grooves thus form an element for channeling 17 a lubricant. According to this embodiment, these channels are machined directly into a shoe forming a guiding element for the first component and, as a consequence of this, are made at least partially from PEEK or are coated at least partially with PEEK. Alternatively, these channels may be obtained by different means, and may be arranged on a guiding element made from any other material. Finally, a guiding element according to the invention may or may not be lubricated. Advantageously, if the guiding means is lubricated, a perfluorinated lubricant may be utilized.

Thus, the invention also relates to a watch device, more particularly an external watch device, comprising two components 1, 21 linked to one another, the first component 1 comprising a first guiding element 10 and the second component 21 comprising a second guiding element 30, the two components being linked to one another in a movable manner by the cooperation of their respective guiding elements 10, 30, and wherein the guiding element 10 of the first component 1 comprises an element for channeling 17 a lubricant.

The invention is described on the basis of an extension device for a watch bracelet. As has already been mentioned, it is naturally applicable to any watch device comprising two movable components.

In addition, the invention also relates to a watch bracelet and/or a clasp and/or a wristwatch and/or an external watch device comprising at least one external component, which integrate(s) at least a watch device as described previously. An external watch device is intended as a device comprising at least one external component, and for example first and second external watch components, linked together. As examples, such watch components could be a link or a linkage of a bracelet strand, a shoe or a roller. Such watch components could also be a cover of a bracelet clasp, or a bracelet clasp blade, or a middle of a watch case, or a bezel of a watch case.

The invention claimed is:

1. A watch device, comprising:

a first component and a second component linked to one another, the first component comprising a first guiding element and the second component comprising a second guiding element, the first component and the second component being linked to one another in a movable manner by cooperation of the respective first and second guiding elements, wherein the first guiding element comprises a guiding surface in contact at least partially with the second guiding element, the guiding surface comprising a polymer material belonging to the family of polyaryl ether ketones (PAEK), and wherein the polymer material belonging to the PAEK family comprises a filler charge, the filler charge comprising reinforcement fibers.

2. The watch device as claimed in claim 1, wherein the respective first and second guiding elements of the first and second components are adapted to permit relative sliding of the first and second components.

3. The watch device as claimed in claim 2, wherein the first guiding element is in the form of a roller or a shoe, cooperating with the second guiding element in the form of a slide, a runner, a cutout, a bore or a groove, or wherein the first guiding element is in the form of a slide, a runner, a cutout, a bore or a groove, cooperating with the second guiding element in the form of a roller or a shoe.

4. The watch device as claimed in claim 2, wherein the respective first and second guiding elements of the first and second components are adapted to permit relative sliding of the first and second components according to a translational movement or a substantially translational movement.

5. The watch device as claimed in claim 2, wherein the first guiding element is in the form of a shoe and the shoe includes a central bore provided for positioning around a cylindrical receiving zone at an extremity of a spring bar.

6. The watch device as claimed in claim 1, wherein the first guiding element is in a single piece, formed integrally from a polymer material belonging to the PAEK family.

7. The watch device according to claim 6, wherein the first component and the first guiding element form an assembly in a single piece, in a polymer material belonging to the PAEK family.

8. The watch device as claimed in claim 1, wherein the first guiding element comprises a core covered with a coating comprising the polymer material belonging to the PAEK family forming the guiding surface.

9. The watch device as claimed in claim 1, wherein the first component and the first guiding element are two separate elements.

10. The watch device as claimed in claim 1, wherein the second guiding element also comprises a guiding surface comprising a polymer material belonging to the PAEK family in contact at least partially with the first guiding element.

11. The watch device as claimed in claim 1, wherein the first guiding element and/or the first component comprises a first indexing element adapted to cooperate with a second indexing element of the second component.

12. The watch device as claimed in claim 11, wherein the first guiding element and the first indexing element form an assembly in a single piece.

13. The watch device as claimed in claim 1, wherein the first guiding element comprises an element for channeling a lubricant.

14. The watch device as claimed in claim 13, wherein the element for channeling a lubricant is in the form of grooves positioned in the guiding surface of the first guiding element.

15. The watch device as claimed in claim 1, wherein:

the watch device is an extension device for a watch bracelet, the first component being an extension link and the second component being a cover or a component of a clasp, or vice versa; or the watch device is a link, the first component being a first half-link of the link and the second component being a second half-link of the link; or the watch device is an external watch device for a wristwatch, the first component being a first external element of a watch and the second component being a second external element of a watch.

16. The watch device as claimed in claim 1, wherein the polymer material belonging to the PAEK family is made from PEEK, or the filler charge further comprises a lubricating agent or graphite.

17. The watch device as claimed in claim 1, wherein the second component and/or the second guiding element is made from a ceramic material or from a metallic material or a metallic alloy.

18. A clasp having deployment blades for a watch bracelet, wherein the clasp comprises a watch device as claimed in claim 1.

19. A bracelet, wherein the bracelet comprises a watch device as claimed in claim 1.

20. A timepiece, wherein the timepiece comprises a watch device as claimed in claim 1.

21. The watch device as claimed in claim 1, wherein the watch device is an external watch device.

22. The watch device as claimed in claim 1, further comprising a part comprising attachment studs on a lateral face, which are provided in order to be pushed into bores of a lateral extension link of the first component, the part comprising the first guiding element which comprises the first guiding surface on a second lateral face.

* * * * *